(12) United States Patent
Sahani et al.

(10) Patent No.: US 11,948,417 B2
(45) Date of Patent: Apr. 2, 2024

(54) TOUCHLESS VISITOR MANAGEMENT

(71) Applicant: VMware, Inc., Palo Alto, CA (US)

(72) Inventors: Hemant Sahani, Palo Alto, CA (US); Saurav Choudhuri, Bangalore (IN); Anoop Adur, Bangalore (IN); Aditya Ulman, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/712,721

(22) Filed: Apr. 4, 2022

(65) Prior Publication Data

US 2022/0351564 A1 Nov. 3, 2022

Related U.S. Application Data

(63) Continuation of application No. 17/306,263, filed on May 3, 2021, now Pat. No. 11,308,747.

(51) Int. Cl.
*G07C 9/27* (2020.01)
*G06K 19/06* (2006.01)
*G07C 9/10* (2020.01)
*G07C 9/22* (2020.01)
*G07C 9/28* (2020.01)

(52) U.S. Cl.
CPC .......... *G07C 9/27* (2020.01); *G06K 19/06009* (2013.01); *G07C 9/10* (2020.01); *G07C 9/22* (2020.01); *G07C 9/28* (2020.01); *G07C 2209/02* (2013.01); *G07C 2209/08* (2013.01)

(58) Field of Classification Search
CPC .. G07C 2209/02; G07C 2209/08; G07C 9/10; G07C 9/22; G07C 9/27; G07C 9/28; G07C 9/20; G07C 11/00; G07C 9/00563; G07C 9/21; G07C 9/215; G07C 9/23; G07C 9/253; G07C 9/37; G06K 19/06009; G06Q 30/02; G06Q 30/0271; G06Q 10/06398; G06Q 10/087; G06Q 10/10; G06Q 10/1095; G06Q 30/0633; G06Q 50/26; G06F 21/6272; G06F 21/645; G06F 21/44; G06F 2221/2119; G06F 16/182; G06F 16/248; G06F 16/252; G06F 16/288; G06F 16/9024; G06F 21/41; G06F 21/45; G06F 9/451; H04L 63/1483; H04L 67/02; H04L 9/3247; G05B 15/02; G05B 19/042; G05B 2219/25011; G05B 23/0218; G06V 20/52; G06V 20/586; G06V 20/625; G06V 40/103; G08G 1/142; G08G 1/148; G08G 1/149

See application file for complete search history.

(56) References Cited

U.S. PATENT DOCUMENTS

| | | | |
|---|---|---|---|
| 9,990,786 B1* | 6/2018 | Ziraknejad | G06F 21/45 |
| 2005/0177750 A1* | 8/2005 | Gasparini | G06F 21/31 726/5 |
| 2018/0343539 A1* | 11/2018 | Oppenheim | H04L 69/28 |
| 2020/0233389 A1* | 7/2020 | Ma | G06Q 10/087 |
| 2021/0118033 A1* | 4/2021 | Coker | G06Q 30/0623 |

\* cited by examiner

*Primary Examiner* — Dionne Pendleton
(74) *Attorney, Agent, or Firm* — King Intellectual Asset Management

(57) ABSTRACT

Disclosed are various approaches for providing touchless visitor management. A visitor can complete a visitor registration process using a client device of the visitor and obtain a virtual badge credential to a visitor's device. A physical access control system credential as well as a visitor badge can also be obtained to the visitor's device.

20 Claims, 4 Drawing Sheets

TOUCHLESS VISITOR MANAGEMENT

CROSS-REFERENCE TO RELATED APPLICATIONS

This application is a continuation of and claims the benefit of U.S. patent application Ser. No. 17/306,263, entitled "TOUCHLESS VISITOR MANAGEMENT," and filed May 3, 2021, which is hereby incorporated by reference in its entirety.

BACKGROUND

In today's environment, smartphones and other devices are becoming more and more ubiquitous and more essential to users. With the advent of mobile payment solutions, many users have even eliminated carrying a physical wallet and carry only a smartphone instead. Alternatively, some users carry a smartphone with an integrated physical wallet to carry physical cards, such as credit cards, identification badges, and proximity cards that are used to access physical resources, such as buildings and rooms in an office environment.

Additionally, as transactions are increasingly touchless, users might desire touchless solutions for enterprise facility visitor management. In a legacy environment, when a visitor arrives at an enterprise facility, they are often asked to complete a physical visitor registration form. In some instances, they are asked to complete the visitor registration form on an enterprise-provided device. Additionally, the visitor is often issued a physical visitor badge, which can provide access to rooms, buildings or other physical resources. Visitors might be expected to present the visitor badge to an access reader, which communicates with the badge using radio-frequency identification (RFID) technology or other localized wireless communication standards or proprietary protocols. In many cases, a visitor is provided with a temporary visitor badge that does not have the capability to communicate with an RFID access reader.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a system that facilitates visitor management using a mobile or wearable client device. The client device can obtain an electronic or virtual badge credential after verifying the identity of a user, and an application on the client device can utilize the virtual badge credential to authenticate the user's access to physical resources. An application on the client device can also act as virtual badge that can display a photo of the user or an identifier that can be used to verify the user's identity by security personnel using another device that captures the identifier.

A visitor can also utilize his or her own client device to complete any visitor registration forms, surveys, or other data entry tasks that an enterprise might require of visitors. Additionally, upon completing the visitor form, the user's device can be provided an expiring link, or a one-time use link, that the user can follow to obtain the virtual badge and download, a physical access control system (PACS) credential for accessing door readers or other physical access control system, and also one or more network credentials, such as a WiFi profile, that can be used to access one or more networks associated with a facility the visitor is visiting.

In many office environments, access control readers can secure access doors to rooms or buildings. A visitor in the environment is often issued a credential, such as a proximity card with which the access control reader communicates using radio frequency identification (RFID) to verify the credential, and the access control reader unlocks a door or provides access a physical resource. To provide access, the access control reader can release a lock that secures the door so that the user can open the door or access another physical resource that is secured by the lock. Additionally, visitors in an office environment might also be required to carry a badge that can be used by security or other personnel to verify the identity of the user. Often, a photograph of the visitor is printed on a physical badge, which often doubles as an access card, that can be shown to others by the user.

Examples of this disclosure can allow a visitor to utilize his or her client device 106 that can act as a visitor badge. The user can also utilize his or her own client device to provide visitor registration information rather than using a device stationed in a visitor lobby or portal. A visitor badge according to examples of the disclosure can include a visitor's photo or another identifier, such as a quick response (QR) code. The identifier can be used by security personnel to access a photo of the user to verify the user's identity. In some cases, a photo of the user can be displayed on a display device associated with the device that captures the identifier or another display that is connected to an access gate or access door.

Figure 1:
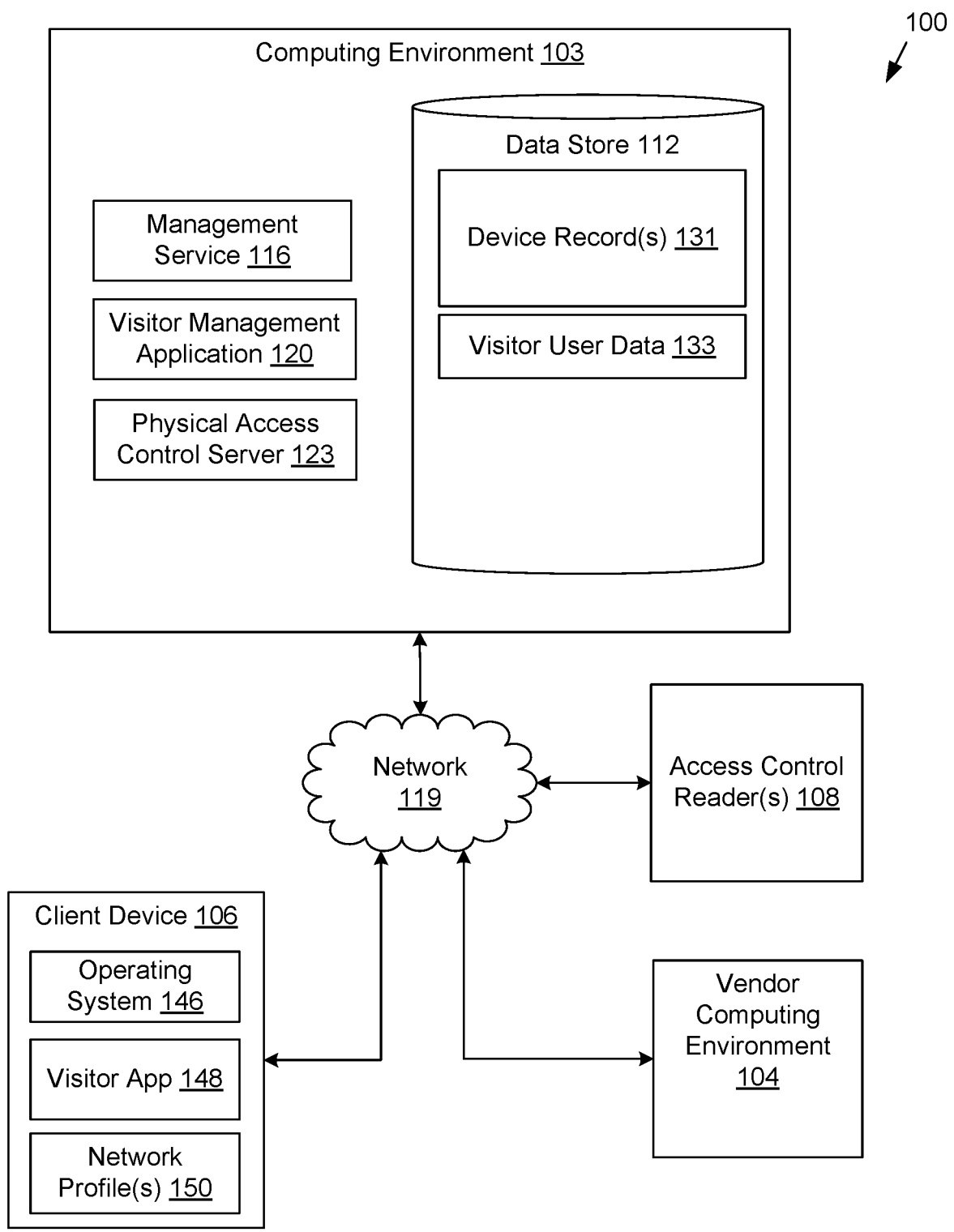
FIG. 1 is a schematic block diagram depicting an example implementation according to various examples of the disclosure.

FIG. 1 illustrates an example of a networked environment 100 according to examples of the disclosure. In the depicted network environment 100, a computing environment 103 is in communication with at least one client device 106, a vendor computing environment 104, and one or more access control reader 108, over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The computing environment 103 and vendor computing environment 104 can be a computing environment that is operated by an enterprise, such as a business or other organization. The computing environment 103 and vendor computing environment 104 include a computing device, such as a server computer, that provides computing capabilities. Alternatively, the computing environment 103 and vendor computing environment 104 can employ multiple computing devices that are arranged in one or more server banks or computer banks. In one example, the computing devices can be located in a single installation. In another example, the computing devices for the computing environment 103 and vendor computing environment 104 can be distributed among multiple different geographical locations. In one case, the computing environment 103 and vendor computing environment 104 include multiple computing devices that together can form a hosted computing resource or a grid computing resource. Additionally, the computing environment 103 and vendor computing environment 104 can operate as an elastic computing resource where the allotted capacity of computing-related resources, such as processing resources, network resources, and storage resources, can vary over time. In other examples, the computing environment 103 and vendor computing environment 104 can include or be operated as one or more virtualized computer instances that can be executed to perform the functionality that is described herein.

Various applications or other functionality can be executed in the computing environment 103. Also, various data can be stored in a data store 112 that can be accessible to the computing environment 103. The data store 112 can be representative of a plurality of data stores 112. The data stored in the data store 112 can be associated with the operation of the various applications or functional entities described below.

The components executed on the computing environment 103 can include a management service 116, a visitor management application 120, a physical access control server 123, and other applications, services, processes, systems, engines, or functionality not discussed in detail herein.

In some implementations or in certain cases, devices associated with users in a corporate environment can be managed devices that are enrolled with a management service 116. The management service 116 can be executed by the computing environment 103 in an on-premises implementation or in another computing environment that is separate from the computing environment 103. The management service 116 can also be provided with access to information about users, physical resources, physical access credentials.

The management service 116 can monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116. The management service 116 can also initiate installation of configuration profiles that can be accessed by certain applications installed on a client device 106. In the context of this disclosure, a client device 106 associated with a visitor need not be enrolled as a managed device. However, the management service 116 can facilitate the creation of network credentials that can be issued to a client device 106 that allow the client device 106 to access an enterprise network, such as a WiFi network.

The physical access control server 123 can facilitate authentication of badge credentials that are presented to access control readers 108. The physical access control server 123 can receive requests to generate badge credentials from the visitor management application 120 or an administrator, cause a badge credential to be created on behalf of a user, and store the badge credential in the data store 112. The physical access control server 123 can also receive a request to authenticate a badge credential on behalf of an access control reader 108. In some examples, request can be received from a physical access controller that is connected to multiple access control readers 108 over a short-range network because an access control reader 108 may not have access to the network 119.

The data stored in the data store 112 can include a visitor user data 133 and potentially other information to support the execution of the management service 116, visitor management application 120 or physical access control server 123. The data store 112 can include device records 131 and visitor user data 133. The data store 112 can also include various objects and data structures that are associated with an enterprise directory of user accounts and devices. Objects within the data store 112 can be organized into data structures, such as forests, trees, domains, organizational units, groups, partitions, or other organizational structures depending upon a directory service that might be utilized by the enterprise. Additionally, the directory can be replicated across more than one data store 112 for redundancy purposes. The inner-workings and specific structure of the directory are not shown or discussed herein, as they are not necessary for an understanding of examples of this disclosure. Additionally, the directory of users and devices might be separate from user data that is maintained or utilized by the management service 116, visitor management application 120 or physical access control server 123. However, the exact configuration of user data and device data is not necessary for a full understanding of examples of the disclosure.

Device records 131 can include information about a client device associated with a visitor. When a visitor registers with an enterprise, the visitor management application 120 can facilitate distribution of network credentials, a virtual visitor badge, and other data to the visitor. Some of these resources can be distributed to the client device of the user. Accordingly, the management service 116 can create a device record 131 associated with a visitor client device without enrolling device as a managed device using the EMM framework provided by the operating system of the client device 106.

A device record 131 can include information that can be obtained about a visitor client device 106 from a visitor form as well as an application that might be installed on the device of the user. For example, the device records 131 can include information about the operating system, device type, device capabilities, and other data about a client device 106 that is being used by the visitor to register as a visitor.

Visitor user data 133 can include information associated with users who register as visitors to a location managed by the visitor management application 120. Visitor user data 133 can be obtained from the user by providing the user with a visitor registration form. The visitor can enter information requested by the enterprise, such a first name, last name, email address, phone number, a photo of the visitor, a copy of the visitor's identification, business card, and a person in the enterprise that the visitor is visiting. The visitor user data 133 can also include a building, location, or other information about the area of the enterprise facility that the visitor is visiting. Visitor user data 133 can also include responses to survey questions that the enterprise might require the visitor to answer to visit a facility, such as a health survey, security questions, or other queries for which responses are required by the enterprise, organization, or facility that is being visited.

Visitor user data 133 can further include data regarding a virtual visitor badge generated for the visitor, including one or more identifiers, text, and/or pictures embedded in the visitor badge. Visitor user data 133 can include a PACS credential that can be used by a client device 106 of the visitor to access one or more access control readers 108 in the facility. Visitor user data 133 can also include information about the visitor's visit to the facility. For example, visitor user data 133 can include a duration of the visit, users of the enterprise the visitor is visiting, and other information. The information about the visitor can also be entered by a host of the visitor prior to the visitor's arrival.

Visitor user data 133 can also include an expiring link, or a one-time-use link, that can be generated by the visitor management application 120 when the visitor is approved as a visitor. The expiring link can be a link to a page, application, or other network location at which the visitor can obtain a virtual visitor badge, a visitor application, network credentials, PACS credentials, or other data.

An access control reader 108 represents an access control device that can capture an identifier or credential from a proximity card, smart card, contactless card, or other type of badge or credential. The access control reader 108 can operate an actuator that controls a physical or electronic lock securing access to a physical resource. The access control reader 108 can capture a credential from a badge, proximity card, RFID device, or other device that communicates using a standard supported by the access control reader 108. Once captured, the access control reader 108 can determine whether the credential embedded in the device supplying the credential should be granted access to a physical resource secured by the access control reader 108. If access should be granted, the access control reader 108 can cause a door to be unlocked, an elevator button to be enabled, an entry gate to be opened, or perform an action to cause access to a physical resource to be granted. If access should not be granted, the access control reader 108 can display or otherwise signal an error that access is not granted to the physical resource. If access should not be granted, the access control reader 108 can also simply do nothing.

The access control reader 108 can communicate with badges, proximity cards, or other devices providing credentials over NFC, ultrawide band (UWB) RFID, Bluetooth, Bluetooth low energy, smart-card reader interfaces or other wireless or wired communication protocols. The access control reader 108 can be flashed by the manufacturer with a decryption key with which credentials can be decrypted. The decryption key can be a private key that corresponds to a public key with which a credential is encrypted by or on behalf of the device providing a credential to the access control reader 108.

In some scenarios, access control readers 108 might not be equipped with the ability to communicate with the network 119 to ease deployment or reduce the cost and complexity of deploying the device in a large scale enterprise. Accordingly, a physical access controller can be provided that can communicate with the network 119 on behalf of access control readers 108. The physical access controller can be a computing device that is in local communication with multiple access control readers 108 in a deployment and that is also in communication with the physical access control server 123 and potentially the vendor computing environment 104 over the network 119. When the access control reader 108 is presented with a credential, the access control reader 108 can provide the credential to the physical access controller for a decision as to whether to grant access to the physical resource.

The vendor computing environment 104 represents one or more computing devices operated by or on behalf of a manufacturer of the access control readers 108 that can be deployed in an enterprise environment. The vendor computing environment 104 can execute a service that is a network accessible service that provides API's through which a customer of the vendor can request and obtain PACS credentials that can be used by the enterprise to issue to its users and to visitors. In one scenario, the enterprise can obtain physical credentials, such as a set of proximity cards, that can be issued to its users. The physical credentials can have an encrypted credential embedded therein. The encrypted credential can be encrypted using a public key that corresponds to a private key to which the access control reader 108 or physical access controller has access.

Additionally, the enterprise can obtain virtual badge credentials from the vendor computing environment 104 using an API provided by the manufacturer, seller, or distributor of the physical credentials or the access control readers 108, for example. Accordingly, the visitor management application 120 can obtain a virtual badge credential for a visitor when the visitor is approved as a visitor of a facility. The visitor management application 120 can also delete or disable the virtual badge credential once the visitor's visit to the facility has ended.

The client device 106 can represent a computing device or mobile device associated with a visitor. The client device 106 includes, for example, a processor-based computer system. According to various examples, a client device 106 can be in the form of a desktop computer, a laptop computer, a personal digital assistant, a mobile phone, a smartphone, or a tablet computer system.

In one implementation, the client device 106 can execute an operating system 146. The operating system 146 can represent a mobile or desktop operating system such as iOS™, Android, Windows™ or other computing environments. The operating system 146 can provide a mechanism whereby a network profile 150, such as a WiFi profile, that includes instructions or credentials for accessing a network, can be installed onto the client device 106 by the user. A network profile 150 can be downloaded using a browser application or another application installed on the client device 106.

A visitor application 148 can also be installed on the client device 106 in some implementations. The visitor application 148 can represent an application that can obtain a virtual visitor badge, PACS credentials, network profiles 150 or other data associated with a visitor's visit to a facility. The visitor application 148 can be installed by the user after directing the client device 106 to an application repository from which the visitor application 148 can be obtained.

In one implementation, a requirement to obtain a virtual visitor badge or PACS credential would be host approval of the visitor. Once obtained, the virtual visitor badge can be presented by the visitor application 148 in the event that the user is requested to do so by facility personnel so that the visitor can be verified or authenticated. Additionally, a PACS credential can be presented by the visitor application 148 to an access control reader 108 to access physical resources secured by the access control reader 108. The PACS credential can be presented to the access control reader 108 using Bluetooth low energy, near-field communication (NFC) or another local or personal area network interface supported by the client device 106 and the access control reader 108.

The virtual visitor badge can incorporate an user identifier embedded in a QR code or another encoding method that can be displayed or obtained from the client device 106. The virtual visitor badge can also include photo of a user that can be verified by security personnel in a facility. In some implementations, image recognition can be utilized to scan a photo on the badge of the visitor so that user details about the visitor can be retrieved on a security personnel device. For example, the virtual badge may have only the image of the visitor which they have uploaded during the registration process. When this badge, or the image of the visitor is scanned, the security personnel will get all the required details of the visitor.

In some implementations, the virtual visitor badge and the PACS credential are incorporated into the same construct. In one scenario, when the user taps his device on an access control reader 108 or approaches the access control reader 108, the visitor application 148 can provide data associated with the virtual visitor badge to the access control reader 108. The access control reader 108 can then display a visitor identifier or photo of the visitor on a display that is near or in communication with the access control reader 108. The virtual visitor badge data can be stored in the data store 112.

Figure 2:
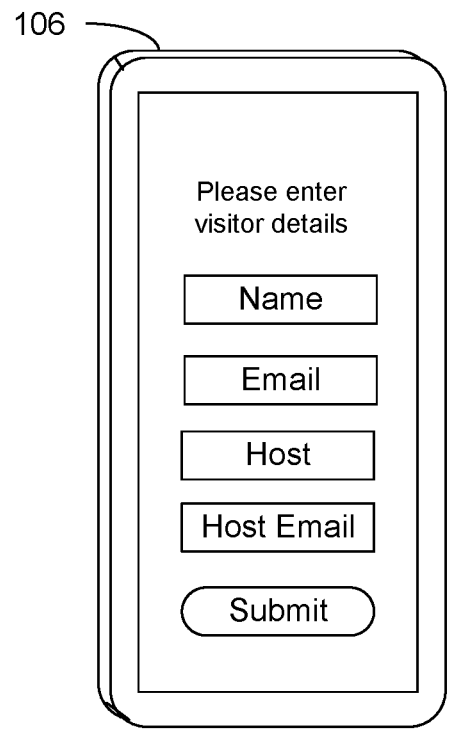
FIG. 2 is an example of the visitor application executed by a client device according to examples of the disclosure.

Referring next to FIG. 2, shown is an example of a visitor application 148 executed by a client device 106 that can be utilized by a visitor to complete a touchless visitor registration process according to examples of the disclosure. In the example of FIG. 2, the visitor, when approaching or entering a visitor lobby, can be provided with a link to a visitor registration portal. The visitor registration portal can be a website or form in which the visitor can enter visitor registration data. The visitor registration portal can be generated by the visitor management application 120.

The link to the visitor registration portal can be provided to the client device 106 by prompting the user to scan a QR code displayed in a lobby or scan an RFID or NFC tag that is provided in the lobby. The link can be a uniform resource locator (URL) that causes the client device 106 to open a browser and access a website that provides the visitor registration portal.

In some implementations, the visitor registration portal can require the visitor to scan or capture an image of identification, such as a photo identification, business card, or other identification, if available. The identification can be uploaded to the visitor management application 120 and stored in the data store 112. Additionally, the visitor management application 120 can also require the visitor to submit a survey or answer questions that are required by the enterprise for visitors, such as health survey questions, security questions, or any other queries that the enterprise might require for visitors.

Once the user submits that visitor registration form, the visitor management application 120 can identify a host, or a person within the enterprise that the user has entered as his or her sponsor for the visit. The visitor management application 120 can generate a notification that can be sent to the host's device. The notification can be sent to an enterprise application through which users within the enterprise access various applications and services provided by the enterprise. For example, the notification can be sent to a single sign-on application that provides an enterprise application portal. In another example, the notification can be sent to the host by email or a messaging service.

The notification can inform the host that they have a visitor in a particular lobby or area of a facility of the enterprise. The host can either approve or deny the visitor. If the request is denied or ignored, the visitor can be denied entry to the facility. If request is approved by a host user, the client device 106 of the visitor can be provided an expiring link or one-time-use link through the visitor registration portal. The expiring link can also be provided by email or messaging to the client device 106. The expiring link can comprise multiple hyperlinks from which the user can obtain a visitor badge, a network credential, and/or a PACS credential that can be utilized to access one or more access control readers 108 in the facility.

Figure 3:
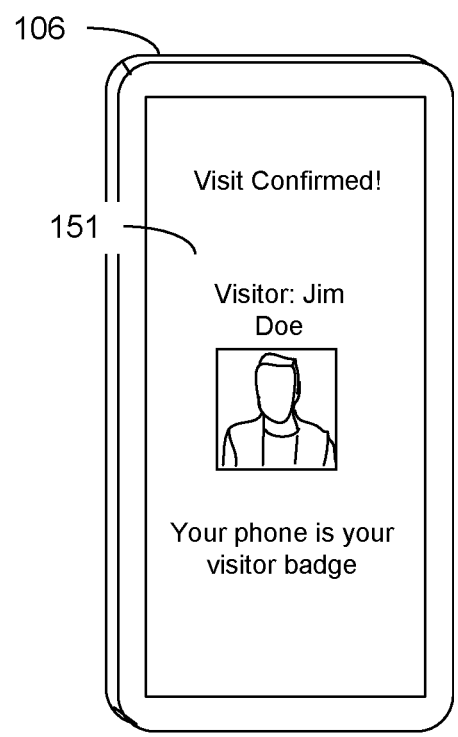
FIG. 3 is an example of the visitor application executed by a client device according to examples of the disclosure.

As shown in FIG. 3, the visitor's request has been approved, and the client device 106 has been provided a virtual visitor badge. In some implementations, the virtual visitor badge can include a photo 151 of the visitor. Upon following the expiring link provided to the client device 106, the visitor is provided with a virtual visitor badge. In one implementation, a virtual visitor badge can be issued to the user's device as an image or document that can be rendered by an application that is already on the client device 106. In another implementation, the virtual visitor badge can be issued as a badge that is viewable by the visitor application 148 or a special purpose application on the client device 106. The virtual visitor badge can be provided as a uniform resource identifier (URI) that links to a downloadable version of the virtual visitor badge.

In one example, the client device 106 can be provided with a URI that identifies the visitor application 148 as the application that can open the virtual visitor badge. If the application is already installed on the client device 106, the visitor application 148 can be opened to access the virtual visitor badge to which the URI links. If the application is not installed on the client device 106, the URI can cause the operating system 146 to prompt the user to install the visitor application 148.

In some examples, expiring link can also comprise a page that links to a downloadable PACS credential that can be utilized in an access control reader 108 associated with one or more doors in the facility. In some examples, upon approval of the visitor by the host of the visitor or by an automated approval mechanism by the visitor management application 120, the visitor management application 120 can create a PACS credential by requesting a new credential or a credential from a pool of visitor credentials from an API provided by a vendor computing environment 104. In some examples, the physical access control server 123 can request or generate the PACS credential for the visitor management application 120.

In some examples, a visitor's request to obtain a visitor badge can be pre-approved by a host. For example, the host can create a visitor record that identifies the visitor's name, email address, and date of visit. The visitor record can also include a pre-approved facility that the visitor is permitted to visit. Upon completing the visitor registration form, the visitor management application 120 can identify a corresponding visitor record that matches the data entered into the visitor form. If such a record exists, the visitor can be automatically approved and provided an expiring link that in turn provides a virtual visitor badge and/or PACS credential to the client device 106 of the visitor.

The expiring link can also include one or more network credentials, such as a WiFi profile, that can be downloaded to the client device 106 and installed by the operating system 146 of the client device 106. The network profile 150 can include a WiFi password or certificate that enables the client device 106 to access to a corporate or corporate guest network in the facility. Upon approval of the visitor, the visitor management application 120 can generate a WiFi profile that is unique to the client device 106. The WiFi profile can be provided to the user via the expiring link and installed on the client device 106 by the visitor application 148 or the operating system 146. In some examples, the visitor management application 120 can request that the management service 116 create a temporary user account or temporary device account for the visitor's client device 106. The temporary account can be valid for the duration of the visitor's visit to the facility and deleted or disabled after the visitor's visits ends or expires.

Figure 4:
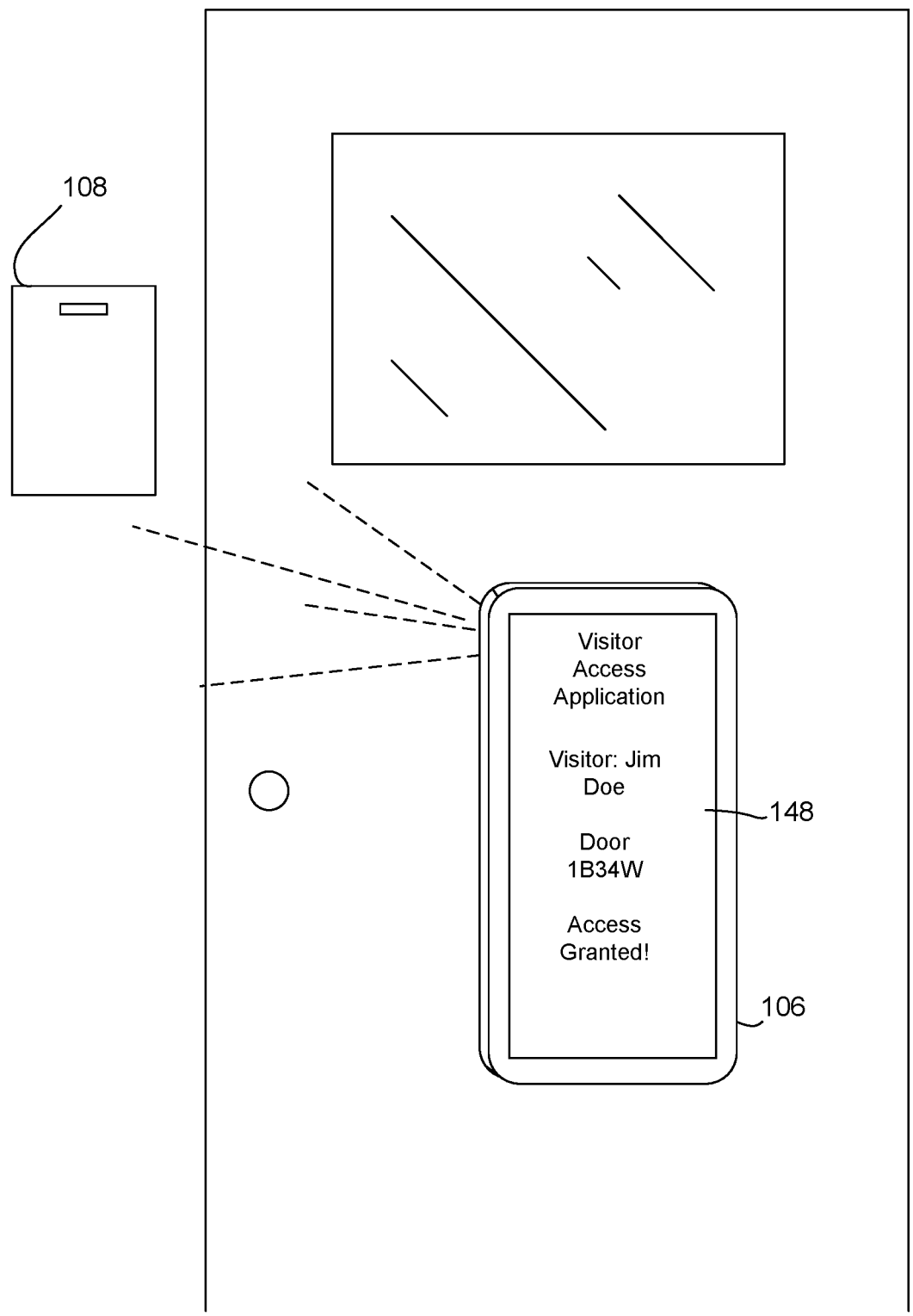
FIG. 4 is an example of the visitor application executed by a client device according to examples of the disclosure.

Referring next to FIG. 4, shown is an example of how a visitor can utilize his or her own client device 106 to access an access control reader 108. Accordingly, to unlock the door, a user can approach the access control reader 108 with a client device 106 running the visitor application 148 that has obtained a virtual visitor badge credential on behalf of the visitor. The visitor application 148 can be configured to automatically launch when in the proximity of the access control reader 108 through a Bluetooth or NFC session or via UWB or other wireless technologies. The communication session with the access control reader 108 can be initiated by the operating system of the client device 106 once the client device 106 is within a configurable range of the access control reader 108. The configurable range can be based on a signal strength threshold that can be adjusted by the user or by an administrator. The communication session with the access control reader 108 can also be initiated by the access control reader 108 rather than by the client device 106.

Once a communication session between the client device 106 and the access control reader 108 is established, the visitor application 148 can provide a PACS credential to the access control reader 108. The access control reader 108 can query a physical access controller or the physical access control server 123 with the credential. The physical access controller or physical access control server 123 can respond to the access control reader 108 with an indication of whether the credential is entitled to access the physical resource secured by the access control reader 108. If the credential is entitled, the access control reader 108 can cause the door to be unlocked. If the credential is not entitled, the access control reader 108 can cause the door to remain locked or do nothing.

Figure 5:
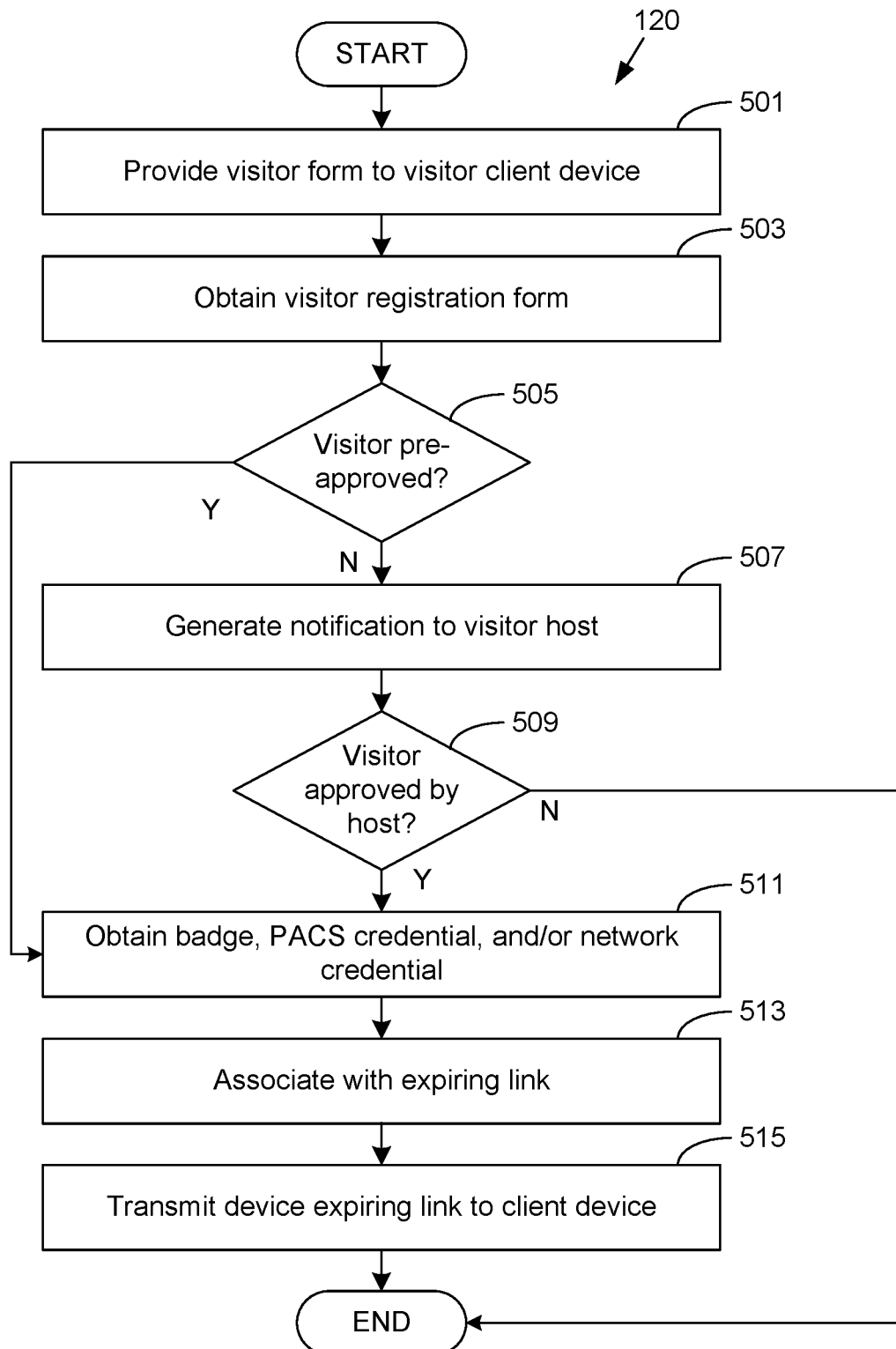
FIG. 5 is a flowchart that illustrates functionality according to examples of the disclosure.

Referring to FIG. 5, shown is a flowchart that provides one example of how the visitor management application 120 can facilitate touchless visitor management according to examples of the disclosure. In the example of FIG. 5, the process can be implemented in a computing environment 103 and utilized in a visitor lobby to manage visitors to an enterprise facility.

First, at step 501, the visitor management application 120 can provide a visitor registration form to a client device 106 of a visitor. The visitor registration form can be provided by transmitting a URI to the client device 106. The URI can be provided to the client device 106 by embedding the URI into a QR code that is displayed in a visitor lobby. The URI can also be provided via an RFID or NFC tag that is provided in the visitor lobby, and the visitor is prompted to tap the RFID tag or NFC tag to begin the visitor registration process. The URI can cause the client device 106 to open the visitor registration form in a browser application on the client device 106.

At step 503, the visitor management application 120 can obtain information entered into the visitor registration form from the client device 106. The information can include the visitor's name, email address, an identity of a host that is hosting the visitor, a photo of the visitor, a photo or scan of the visitor's identification, business card, or other information that can be requested from the visitor Again, as noted above, the visitor registration form can also include responses to questions or a survey that the enterprise can request or require from the visitor. The questions can include a health or security questionnaire that must be correctly answered before the visitor is granted entry into the facility. In one example, the visitor management application 120 can be configured to automatically deny access to the visitor if the visitor answers a particular question in a way that determines the visitor is not entitled access to the facility. For example, if the visitor responds that he or she has an illness that disqualifies the visitor from entering the facility, the visitor management application 120 can deny the request to allow the visitor access to the facility without additional intervention by a host or lobby attendant.

At step 505, upon completion of the visitor registration form and after receiving the visitor registration data from the visitor registration form, the visitor management application 120 can determine whether the visitor has been pre-approved or pre-registered as a visitor by a host. The visitor management application 120 can make this determination by checking the visitor user data 133 to determine whether an indication that a visitor with a name, email address, phone number, visit date, and/or other identifying information is associated with a visitor record that is also indicated as pre-approved. If the visitor is pre-approved, the process can proceed to step 511. If the visitor is not indicated as pre-approved, the process can proceed to step 507.

At step 507, the visitor management application 120 can generate a notification that is sent to a host identified in the visitor registration data submitted in the visitor registration form. The notification can be sent to a client device of a host, such as in an enterprise application in which enterprise notifications, data, and other information is presented. The notification can also be sent by email or a messaging service. The notification can include information presented in the visitor information form, such as the name, email address, and other identifying information about the user. The notification can also request that the host authorize the visitor. The notification can also request that the host approve or deny the visitor request.

At step 509, the visitor management application 120 can determine whether the host has approved the visitor request in response to the notification. If the host has denied the request, the process can proceed to completion. In some embodiments, the visitor management application 120 can notify the visitor through the client device 106 that their request has been denied. In some examples, the request can be denied after a timeout period.

If the visitor management application 120 receives approval of the request from a host, the process can proceed to step 511. At step 511, the visitor management application 120 can generate or obtain one or more of a virtual visitor badge, a PACS credential for accessing one or more access control reader 108 in the facility, and a network credential for accessing an enterprise network or guest network associated with the facility. In some examples, the PACS credential and visitor badge can be combined into a single virtual badge that can be accessed by the visitor application 148 on the client device 106.

The virtual visitor badge can include an identifier with which the visitor can be identified if challenged by personnel or by a badge reader. The identifier can include one or more of the visitor's name, email address, photo, an alphanumeric identifier, a barcode, a QR code, dates of the visit, or other text with which the visitor can be identified. The visitor badge can be viewable as a standalone document or image or viewable only through a special purpose app, such as the visitor application 148.

The PACS credential can be obtained from the physical access control server 123 or the vendor computing environment 104 through a vendor API with which PACS credentials can be generated. The PACS credential can be provided to the visitor application 148 or a special purpose application on the client device 106 that can present the PACS credential to one or more access control reader 108 on behalf of the visitor.

The network credential can be a network profile or WiFi profile that can be installed onto the client device 106 and provide access to an enterprise or enterprise guest network. The network credential can also be provided in text form, such as the name of the network and/or the network password. If provided as an installable profile, the visitor application 148 or the operating system 146 of the client device 106 can install the profile onto the client device 106 so that the visitor can utilize a network of the enterprise during his or her visit. In some implementations, the credentials issued to the client device 106 can expire after an expiration time period or at the end of the visitor's visit.

At step 513, the visitor badge, PACS credentials, and/or network credential can be associated with an expiring link, or a one-time-use link. The expiring link can be associated with the visitor in the visitor user data 133. The expiring link can expire after it is accessed by the visitor using his or her client device 106. The expiring link can comprise a URI that points to a resource that includes the downloadable virtual visitor badge, PACS credential, and/or network credential. The URI can comprise a deep link that causes the visitor application 148 to be launched on the client device 106 and for the visitor application 148 to access the resource. The resource can be encoded such that it can be opened only by the visitor application 148. The URI can also cause the operating system 146 of the client device 106 to redirect the user of the client device 106 to an application marketplace to install the visitor application 148 if the visitor application 148 is not installed on the client device 106.

The expiring link can also point to a page that can be opened in a browser of the client device 106 that provides additional links to a downloadable virtual visitor badge, PACS credential and/or network credential.

At step 515, the expiring link can be sent to the visitor's client device 106. The link can be sent to the client device 106 in an email, messaging notification, or presented in a browser page in response to submission of the visitor registration form. Thereafter, the process can proceed to completion.

The flowchart of FIG. 5 shows examples of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 5 shows a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, computing environment 103, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 116, visitor management application 120, visitor application 148, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system for touchless visitor management comprising:
at least one computing device; and a visitor management application executable by the at least one computing device, the visitor management application causing the at least one computing device to at least:
    obtain a request to register a visitor;
    provide a registration link to a client device associated with the visitor, the registration link pointing to a visitor registration portal;
    obtain visitor registration data associated with the visitor from the visitor registration portal;
    obtain confirmation of the request to register the visitor; and
    generate an expiring link that is unique to the visitor, the expiring link comprising a link to at least one facility access credential for the visitor, wherein the at least one facility access credential is transmitted to a client device of the visitor and wherein the expiring link comprises a one-time use link that expires after being accessed by the client device, wherein the expiring link further links to a network profile comprising credentials for accessing a network.

2. The system of claim 1, wherein the expiring link further directs a client device of the visitor to install an application that can obtain the downloadable profile or the at least one facility access credential.

3. The system of claim 1, wherein the visitor management application further causes the at least one computing device to at least:
    generate a physical access control system (PACS) credential providing access to at least one PACS reader associated with a facility; and
    provide the PACS credential to the client device in response to the client device accessing the expiring link.

4. The system of claim 1, wherein the visitor management application further causes the at least one computing device to at least disable the expiring link in response to the client device accessing the expiring link.

5. The system of claim 1, wherein the expiring link further comprises a second link to a to a downloadable profile, the downloadable profile associated with a digital visitor badge comprising a code that is verifiable by another device.

6. The system of claim 1, wherein the at least one facility access credential further comprises an enterprise network credential providing guest access to an enterprise network, wherein the enterprise network credential is downloadable as a network profile to the client device.

7. The system of claim 1, wherein the expiring link further comprises a link to a page comprising a visitor information survey, wherein the visitor management application withholds the at least one facility credential or a digital visitor badge until successful completion of the visitor information survey.

8. A method comprising:
    obtaining a request to register a visitor;
    providing a registration link to a client device associated with the visitor, the registration link pointing to a visitor registration portal;
    obtaining visitor registration data associated with the visitor from the visitor registration portal;
    obtaining confirmation of the request to register the visitor; and
    generating an expiring link that is unique to the visitor, the expiring link comprising a link to at least one facility access credential for the visitor, wherein the at least one facility access credential is transmitted to a client device of the visitor and wherein the expiring link comprises a one-time use link that expires after being accessed by the client device, wherein the expiring link further links to a network profile comprising credentials for accessing a network.

9. The method of claim 8, wherein the expiring link further directs a client device of the visitor to install an application that can obtain the downloadable profile or the at least one facility access credential.

10. The method of claim 8, further comprising:
    generating a physical access control system (PACS) credential providing access to at least one PACS reader associated with a facility; and
    providing the PACS credential to the client device in response to the client device accessing the expiring link.

11. The method of claim 8, further comprising disabling the expiring link in response to the client device accessing the expiring link.

12. The method of claim 8, wherein the expiring link further comprises a second link to a to a downloadable profile, the downloadable profile associated with a digital visitor badge comprising a code that is verifiable by another device.

13. The method of claim 8, wherein the at least one facility access credential further comprises an enterprise network credential providing guest access to an enterprise network, wherein the enterprise network credential is downloadable as a network profile to the client device.

14. The method of claim 8, wherein the expiring link further comprises a link to a page comprising a visitor information survey, wherein the visitor management application withholds the at least one facility credential or a digital visitor badge until successful completion of the visitor information survey.

15. A non-transitory computer-readable medium comprising machine-readable instructions, wherein when executed by a processor of at least one computing device, the machine-readable instructions cause the at least one computing device to at least:
    obtain a request to register a visitor;
    provide a registration link to a client device associated with the visitor, the registration link pointing to a visitor registration portal;
    obtain visitor registration data associated with the visitor from the visitor registration portal;
    obtain confirmation of the request to register the visitor; and
    generate an expiring link that is unique to the visitor, the expiring link comprising a link to at least one facility access credential for the visitor, wherein the at least one facility access credential is transmitted to a client device of the visitor and wherein the expiring link comprises a one-time use link that expires after being accessed by the client device, wherein the expiring link further links to a network profile comprising credentials for accessing a network.

16. The non-transitory computer-readable medium of claim 15, wherein the expiring link further directs a client device of the visitor to install an application that can obtain the downloadable profile or the at least one facility access credential.

17. The non-transitory computer-readable medium of claim 15, wherein the machine readable instructions further cause the processor at least:
    generate a physical access control system (PACS) credential providing access to at least one PACS reader associated with a facility; and provide the PACS credential to the client device in response to the client device accessing the expiring link.

18. The non-transitory computer-readable medium of claim 15, wherein the expiring link further comprises a second link to a to a downloadable profile, the downloadable profile associated with a digital visitor badge comprising a code that is verifiable by another device.

19. The non-transitory computer-readable medium of claim 15, wherein the at least one facility access credential further comprises an enterprise network credential providing guest access to an enterprise network, wherein the enterprise network credential is downloadable as a network profile to the client device.

20. The non-transitory computer-readable medium of claim 15, wherein the expiring link further comprises a link to a page comprising a visitor information survey, wherein the visitor management application withholds the at least one facility credential or a digital visitor badge until successful completion of the visitor information survey.

* * * * *